United States Patent
Cruse

(10) Patent No.: US 10,677,224 B2
(45) Date of Patent: Jun. 9, 2020

(54) FLOATING WIND POWER PLANT

(71) Applicant: Linnhoff Offshore AG, Bremerhaven (DE)

(72) Inventor: Jens Cruse, Hamburg (DE)

(73) Assignee: CRUSE OFFSHORE GMBH, Hamburg (DE)

( * ) Notice: Subject to any disclaimer, the term of this patent is extended or adjusted under 35 U.S.C. 154(b) by 346 days.

(21) Appl. No.: 15/027,859

(22) PCT Filed: Sep. 24, 2014

(86) PCT No.: PCT/EP2014/070398
§ 371 (c)(1),
(2) Date: Apr. 7, 2016

(87) PCT Pub. No.: WO2015/051998
PCT Pub. Date: Apr. 16, 2015

(65) Prior Publication Data
US 2016/0245261 A1    Aug. 25, 2016

(30) Foreign Application Priority Data
Oct. 8, 2013    (DE) .......................... 10 2013 111 115

(51) Int. Cl.
*F03D 13/25*    (2016.01)
*B63B 35/44*    (2006.01)
(Continued)

(52) U.S. Cl.
CPC .............. *F03D 13/25* (2016.05); *B63B 1/107* (2013.01); *B63B 1/125* (2013.01); *B63B 21/50* (2013.01);
(Continued)

(58) Field of Classification Search
CPC ......... F03D 13/25; B63B 21/50; B63B 35/44; B63B 2035/446
See application file for complete search history.

(56) References Cited

U.S. PATENT DOCUMENTS 3,957,293 A    5/1976 Rodgers
7,296,971 B2    11/2007 Borgen
(Continued)

FOREIGN PATENT DOCUMENTS

CN    101 918 704 A    12/2010
DE    2457368 A1    10/1975
(Continued)

OTHER PUBLICATIONS

Official Action from German priority Application No. 102013111115.7, dated May 28, 2014.
(Continued)

*Primary Examiner* — Justin D Seabe
(74) *Attorney, Agent, or Firm* — Porter Wright Morris & Arthur LLP

(57)    ABSTRACT

The invention relates to an improved, in particular simpler, lighter, mechanically more stable and operationally more reliable offshore wind power plant (100) that can float. By means of a cable (110) constructed as a combination of a power line that is held at least virtually without loading and a holding cable that absorbs all the mechanical forces that occur for holding the wind power plant on a single fixed-location anchoring point (111), said power plant can be connected to the anchoring point such that the power plant can move with six degrees of freedom. A coupling (112) is arranged at a single connecting point (118) between the cable and the wind power plant and, to make an electrical connection, is constructed with a sliding coupling and, for mechanical transmission of force, is constructed with a swivel coupling. The wind power plant has a supporting unit
(Continued)

(101) constructed as a semi-submersible having ballast units (102) and buoyancy units (103), in particular a floating unit, and a supporting mast (104) which is firmly connected to the supporting unit and has a machine gondola (105) fixedly arranged on the latter and having at least one rotor (106) and at least one electric generator. The highest possible horizontal distance is formed between the connecting point and a substantially vertical plane of rotation of the rotor.

13 Claims, 2 Drawing Sheets

(51) Int. Cl.
*F03D 9/25* (2016.01)
*B63B 1/12* (2006.01)
*B63B 21/50* (2006.01)
*B63B 1/10* (2006.01)
*F03D 1/06* (2006.01)

(52) U.S. Cl.
CPC ............... *B63B 35/44* (2013.01); *F03D 1/06* (2013.01); *F03D 9/25* (2016.05); *B63B 2001/128* (2013.01); *B63B 2035/446* (2013.01); *F05B 2240/2213* (2013.01); *F05B 2240/912* (2013.01); *F05B 2240/93* (2013.01); *F05B 2240/95* (2013.01); *Y02E 10/721* (2013.01); *Y02E 10/725* (2013.01); *Y02E 10/726* (2013.01); *Y02E 10/727* (2013.01); *Y02E 10/728* (2013.01)

(56) References Cited

U.S. PATENT DOCUMENTS

| | | | | |
|---|---|---|---|---|
| 7,612,462 | B2* | 11/2009 | Viterna | .................... B63B 21/50 290/42 |
| 8,169,099 | B2* | 5/2012 | Roznitsky | ............... F03D 13/40 290/44 |
| 2001/0002757 | A1 | 6/2001 | Honda et al. | |
| 2003/0168864 | A1 | 9/2003 | Heronemus | |
| 2004/0103655 | A1 | 6/2004 | Lauritsen | |
| 2006/0269396 | A1 | 11/2006 | Borgen | |
| 2007/0240624 | A1 | 10/2007 | Collee et al. | |
| 2009/0091136 | A1 | 4/2009 | Viterna | |
| 2013/0052015 | A1 | 2/2013 | Velund | |
| 2014/0193259 | A1* | 7/2014 | Borgen | ................... F03D 11/04 416/85 |

FOREIGN PATENT DOCUMENTS

| | | |
|---|---|---|
| DE | 2532665 A1 | 2/1977 |
| DE | 60131072 T2 | 7/2008 |
| DE | 102009040648 A1 | 3/2011 |
| DE | 202010003654 U1 | 9/2011 |
| DE | 102010040887 A1 | 3/2012 |
| DE | 112011100404 T5 | 12/2012 |
| EP | 1269018 B1 | 10/2007 |
| FR | 2970748 A1 | 7/2012 |
| GB | 2450624 A | 12/2008 |
| JP | 09-294500 H | 11/1997 |
| JP | 2001-165032 A | 6/2001 |
| JP | 2005-520088 A | 7/2005 |
| JP | 2007-505784 A | 3/2007 |
| JP | 2010-247646 A | 11/2010 |
| KR | 2006-0008893 A | 1/2006 |
| WO | 02/073032 A1 | 9/2002 |
| WO | 2012/105846 A1 | 8/2012 |
| WO | 2012/105846 A2 | 8/2012 |
| WO | 2012153107 A1 | 11/2012 |
| WO | 2013/110276 A1 | 8/2013 |

OTHER PUBLICATIONS

Official Action dated Apr. 3, 2018 from corresponding Chinese Application No. 201480064650.0.
Official Action dated May 22, 2018 from corresponding Japanese Application No. 2016-547225.
Office Action from corresponding Korean Application No. 10-2016-7012193 dated Feb. 28, 2020, with English Translation.

* cited by examiner

FLOATING WIND POWER PLANT

The invention relates to a floatable offshore wind power plant, i.e. to a wind power plant for use off the coast of outlying bodies of water and/or inland bodies of water.

PRIOR ART

DE 20 2010 003 654 U1 discloses a floating wind power plant for generating electrical power having rotor blades rotating about a horizontal axis of rotation. A power generator driven by the rotor blades is arranged in a hinged manner by means of a hinged bracket on a raft equipped with a plurality of hulls, wherein generator and hinged bracket are connected to the raft via mechanically driven pivot joints operated with horizontal pivot axes. In the case of this wind power plant, connecting cable and anchor chain are fastened to a float at both bows via a bridle, i.e. are divided into a plurality of chains or cables. There is a flexible cable connection which permits automatic orientation of the wind power plant to wind or swell. A releasable connection to the float is provided here for the fastening. Connecting cable and anchor chain are also anchored to a concrete box on the ocean bed. The flexible cable connection permits automatic orientation of the wind power plant to wind or swell. For maintenance and repair, the wind power plant is towed into a dock in a harbor by a crane or into a central maintenance and repair workshop erected on land and is placed on land there by flooding the floats.

Document DE 10 2009 040 648 A1 discloses a floatable offshore wind power plant with a floating body and a construction which is arranged thereon and has masts on which at least one rotor which drives a generator is rotatably mounted. This document furthermore discloses a mechanical coupling of the floatable offshore wind power plant via a plurality of links and a slewing ring to a concrete anchor block which is deposited on the ocean floor and is referred to as a foundation. The links are preferably fastened to the foundation via the slewing ring in order to permit an unobstructed rotational or pivoting movement of the floating body about the foundation so that the orientation thereof can be matched to changing wind directions. The rotational movement of the floating body preferably takes place here without an additional drive. The plant automatically rotates into the wind since the pivot point on the foundation is arranged outside the floating body. The foundation is preferably of floatable and floodable design, and therefore the entire wind power plant can be transported in a floating manner. An electrical coupling to a submarine cable takes place via a power cable and a further slewing ring with a power feedthrough.

According to document DE 10 2009 040 648 A1, the masts depicted there have a droplet-shaped cross-sectional contour which results in a type of supporting surface profile of the masts that provides increased stability in relation to bending forces which occur. Since the wind pressure which acts on the rotor blades cannot be completely converted into a rotational movement, considerable bending loadings arise which have to be absorbed by the construction of the masts. By means of the droplet-shaped cross-sectional contour, wherein the cross section is positioned perpendicularly to the longitudinal extent of the masts, it is not only possible to achieve a loading-optimized configuration of the masts, but also to reduce the forces acting on the masts. A droplet-shaped cross-sectional contour reduces the wind pressure acting on the mast, which makes it possible either to design the construction to be more slender and lighter or to use larger rotors and generators. Furthermore, the droplet-shaped cross-sectional configuration results in the floating body more easily and rapidly being rotated into the wind when the wind direction changes, and therefore the rotors are always optimally oriented with respect to the wind direction without a complicated additional adjustment being necessary.

According to document DE 10 2009 040 648 A1, the floating body furthermore has a central tube which is surrounded by an elliptical or droplet-shaped casing, with an intermediate space being formed. In a similar manner as in the case of the masts, the casing provides a contour which is advantageous in terms of flow and is reminiscent of a wing structure. The elliptical casing or an approximately droplet-shaped casing surrounds the central tube relevant to the statics. The intermediate space can be filled with a foam material, in particular a closed-pored or a dimensionally stable foam which provides the casing with adequate pressure stability. The central tube is preferably designed to be floodable, and therefore the floating level of the wind power plant can be adapted to the respective conditions. The dimensionings of the central tube and of the floating body are selected here in such a manner that the entire wind power plant can be towed in a floating manner to the desired location of use. At the location of use, the wind power plant is anchored and optionally lowered in order to achieve increased stability of the wind power plant. The preferred lowering depth here is 5 to 10 meters under the water surface. Furthermore, the influence of the wave motion and of the surface currents is thereby reduced. The central tube can conversely also be emptied again in order to raise the level of the wind power plant, for example in order to tow the latter into a harbor for maintenance purposes.

The generators are arranged together with the rotors on the masts. The rotors and generators can be arranged at the upper ends of the masts. In principle, it is also possible for the generators not to be arranged directly on the rotors, but rather to be located in the interior of the masts or at a different location on the floating body. It is then necessary to bring the kinetic energy to the respective generators via a gearing and transmission elements. The generators, which are arranged in what are referred to as nacelles on the masts, can be fastened rigidly to the masts, and therefore a complicated rotational fastening of the rotors and generators to the masts via rotary bearings does not have to take place. This furthermore reduces the costs for the production and maintenance of the wind power plant.

Document DE 10 2010 040 887 A1 discloses a floating device for supporting at least one tower in the water with a floating, flat structure for stabilizing the device on the water surface, wherein the at least one tower is supported by the flat structure. The floating device furthermore comprises at least one ballast weight which is arranged under the flat structure in such a manner that the center of gravity of the entire device lies below the hydrostatic buoyancy point of the flat structure, and therefore the at least one tower is substantially perpendicular to the water surface. The flat structure serves as a floating body and interacts with the ballast weight. The latter can be configured as a ballast trough.

Document DE 10 2010 040 887 A1 describes embodiments having different rotation possibilities of the components from one another. These vary from an embodiment in which no axial rotation of the components whatsoever is possible to an embodiment in which the tower, an extension thereof, the ballast weight and also the flat structure can rotate axially about the longitudinal axis of the tower. This gives rise to different movement possibilities. Furthermore, different floating body shapes are described, for example a trapezoid shape, an elliptical shape, a circular shape and a semi-circular shape with a converging point. Of said shapes, the trapezoid shape and the semi-circular shape with the converging point permit automatic orientation of the flat structure into the wind and/or into the current, i.e. the water current.

Document DE 10 2010 040 887 A1 furthermore describes that by a suitable shape of the flat structure, the tower and/or the rotor of the wind power plant, the effect can be achieved that the rotor automatically always rotates in the wind direction. The tower can have different shapes, for example encased cylindrically, but also in a droplet-shaped manner, and therefore the tower (with the rotor) automatically sets itself into the wind. Such a special shape of the tower is used above all in the case of the rotatable tower variants since, in addition to minimizing the wind loads, this leads to the tower itself rotating into the wind.

Document DE 10 2010 040 887 A1 also describes that the flat structure could also be entirely or partially pulled and fixed under the water surface as a semi-submersible by means of a pretensioned anchoring possibility, wherein the ballast weight brings about additional stabilization of the entire unit. A flat structure which itself has a low center of gravity, i.e. lies, for example, up to two thirds under water, is preferred. The flat structure is thereby more stable and the rocking or the risk of tilting/overturning of the flat structure is reduced.

Document DE 11 2011 100 404 T5 exhibits a floating wind power turbine which comprises a rotor attached to a nacelle, an upper pillar which is connected to the rotor, a stabilizer tank which is arranged between the upper pillar and a lower pillar, and an anchor which is connected rotatably to the lower pillar via a cardanic joint which permits rotation in all directions, wherein the buoyancy center point of the stabilizer tank is arranged eccentrically with respect to a longitudinal center axis which runs through the upper and the lower pillar. The nacelle with the roter is fixedly connected to the upper pillar. A slewing ring in the region of a lower anchoring point of the pillar serves together with a slip ring, which is arranged in a cross section of the pillar directly above the water line, for the electrical connection and makes it possible for pillar and rotor to be able to rotate with the wind without additional mechanical force and in the process for the rotor to be located in the lee of the pillar. Automatic self orientation is produced as a result. The slewing ring 14 may expediently have the same specifications as slewing rings which are used, for example, in Liebherr construction cranes, since the latter can withstand water/salt and long term use under extreme conditions. The slewing ring and the slip ring expediently have a structure which prevents twisting of a power cable which runs downward in the wind power turbine from a generator located in the nacelle over a lower part of the wind power turbine to the distribution network.

According to document DE 11 2011 100 404 T5, the upper pillar furthermore has a droplet- or wing-shaped cross section in order to avoid vortices in the rotational region of the rotor and to ensure a maximally laminar air flow behind the pillar. Furthermore, there is a ballast system, wherein the upper and the lower pillar are divided into different chambers which run via respective lines to a common connection point at which a supply cable is connected between an auxiliary ship and the wind power turbine. The stabilizer tank constitutes a separate chamber which is likewise connected to the common connection point via a separate line. The ballast system forms a float with ballast tanks and cavities.

Document DE 11 2011 100 404 T5 describes wind power turbines preferably of the horizontal shaft type with a gearless construction. Only structures different therefrom, for example with a generator arranged vertically in the pillar, have a gearing, for example a bevel gearing, in the nacelle. The gearless design furthermore also constitutes a conventional type.

Document EP 1 269 018 B1, or the translation thereof published as DE 601 31 072 T2, discloses a floating offshore wind power plant, comprising at least one windmill mounted on a floating substructure consisting of at least two pontoons with tanks, wherein the at least one windmill has a machine housing or machine compartment mounted at the upper end of a tower, and the substructure is fixed on the floor of a sea or a lake by means of a connection. The substructure comprises at least two tanks and at least one unit for shifting liquid between the tanks or between the tanks and the environment. At the installation location, the windmill is anchored to the floor of the sea with the aid of an anchor which is connected to the substructure by means of an anchor cable or an anchor chain. In addition, the anchor chain can advantageously be provided with a submarine cable. The submarine cable transmits the electricity generated by the windmill to a fixed cable device on the floor of the sea, from where the electricity generated is conducted to the coast.

In an embodiment referred to as being preferred in document EP 1 269 018 B1 or in the translation thereof published as DE 601 31 072 T2, the machine compartment is anchored fixedly on the tower and the windmill does not have a yaw mechanism. With the fastening on the floor of the sea as a rotation center point, the windmill therefore yaws only with the aid of the yaw of the substructure, thus resulting in automatic self orientation. Furthermore, it is referred to in this document as proven by experience that the wind rarely turns by 360 degrees or more, and therefore distortion of the submarine cable or of the anchor cable or of the anchor chain will not be a problem. Furthermore, the tower is more slender in the wind direction than transversely with respect thereto. In order to limit the wind shadow, the tower is configured in a shape which corresponds to that of the wing profile or the like, which restricts the profile and makes the latter aerodynamic in the direction of the wind.

Document DE 24 57 368 A1 discloses an air hose with a swivel coupling. A compressed air tool can be connected to the air hose via the swivel coupling. The swivel coupling here comprises an inner and an outer connection body. The air hose is clamped and secured to the inner connection body. The outer connection body is screwed into the tool. The inner connection body has a tubular, forwardly directed extension which can be plugged into the hollow outer connection body. The outer and the inner connection body can be twisted relative to each other without the bodies having to be separated from each other. Consequently, the hose can also be twisted in relation to the tool without any torque or pressure being transmitted to the hose. Any bending or entanglement or other damage of the hose is avoided with said swivel coupling.

Document DE 25 32 665 A1 discloses a ski retrieval cable/strap/belt system with a winding-up device. The latter comprises an extension cable, the end of which is connected to a loop of a retrieval cable by means of a two-part swivel coupling. The swivel coupling permits twisting of the two connected cables in mutually opposed directions about the longitudinal axes thereof.

Document WO 02/073032 A1 discloses a floating offshore wind power plant which comprises a single-point anchoring system, a floating body and a wind power generation unit. The floating body which is composed of parts arranged in at least one triangle floats on the ocean surface and is anchored at a point of the triangle on the ocean bed via the single-point anchoring system in order always to keep the floating body in a consistent orientation with respect to the wind. A tower anchor unit is provided as the single-point anchoring system. Said tower anchor unit has a tower in the form of a rotary disk which is connected to a yoke by a bearing in such a manner that the floating body is rotatable horizontally about an anchoring point of the tower. The yoke protrudes laterally on the floating body at one of the points of the triangle. The tower is anchored on the ocean floor by a plurality of anchor chains and anchors. An undersea cable is connected to the floating body via the tower.

SUMMARY OF THE INVENTION: PROBLEM, SOLUTION, ADVANTAGES

The invention addresses the problem of further improving a floatable offshore wind power plant of the type described, in particular of configuring such a wind power plant to be simpler, lighter, more stable mechanically and more reliable operationally.

This problem is solved by a floatable offshore wind power plant which comprises the features below. By means of a cable designed as a combination of a power line, which is held at least virtually without loading, and a holding cable, which at least substantially absorbs all of the mechanical forces occurring for holding the wind power plant at a single positionally fixed anchoring point, the wind power plant can be connected to the anchoring point so as to be movable in six degrees of freedom. A coupling is arranged in a single connecting point between the cable and the wind power plant and is formed with a slip coupling to provide an electrical connection and with a swivel coupling to provide a mechanical transmission of force. The wind power plant has a supporting unit, in particular a float unit, which is designed as a semi-submersible with ballast units and buoyancy units. Furthermore, the wind power plant has a supporting mast which is fixedly connected to the supporting unit and has a machine nacelle which is fixedly arranged on said supporting mast and has at least one rotor and at least one electric generator. A highest possible horizontal distance is formed between the connecting point and a substantially vertical plane of rotation of the rotor.

In principle, a floatable offshore wind power plant has the advantage over a wind power plant grounded on a fixed foundation on the floor of a body of water, in particular a lake, or on the ocean bed, that technically complicated and expensive foundation structures which are susceptible to environmental influences can be dispensed with. At the same time, the entire wind power plant remains maneuverable, i.e., for installation and removal and for maintenance and repair purposes, can easily be shifted from the use location thereof to a location in the vicinity of a bank, in particular into a harbor or the like, and conversely, after installation or repair, can be shifted from the harbor to the use location. This configuration alone results in a significant reduction in costs while at the same time having higher operational readiness and reduced interventions in the environment.

In order to anchor the wind power plant at the use location thereof and in order to transmit the electrical energy obtained, the wind power plant is connected via a cable to a single fixedly arranged anchoring point which is fixed in position, i.e. on the floor of the body of water on which the wind power plant is used. The coupling between the cable, which serves as a combined power line and holding cable, and the wind power plant at the single connecting point is configured in such a manner that an electric slip coupling is provided to the electrical power transmission and that a swivel coupling is provided for the mechanical force transmission. Such a connection or anchoring at a single point, i.e. at a single anchoring point and a single connecting point via a single cable is also referred to as a single-point connection. This construction ensures that the floating wind power plant can move within the scope of the possibilities provided by the length dimension of the cable in three translatory degrees of freedom corresponding, for example, to Cartesian coordinates at the use location, also referred to as the X, Y and Z direction, and that additionally also three rotatory degrees of freedom are provided since a rotation about three spatial axes, for example three axes in the Cartesian system of coordinates, also referred to as the X axis, Y axis or Z axis, is permitted. The coupling between the cable and the wind power plant therefore permits the fully free movement of the latter according to the wind and swell in a total of six degrees of freedom without stressing of the cable impermissibly in type and magnitude thereby being able to occur. In particular, because of this structure, the cable can neither break nor twist even in the event of any translatory and/or rotatory movement of the wind power plant. In comparison to a separate guidance of an anchor cable or anchor chain and of an electric connection cable, the advantage is additionally afforded that a cable combining electrical and mechanical connection prevents twisting as has to occur in the case of separate guidance because of rotational movements of the wind power plant.

Furthermore, the design of the cable serves for relieving sensitive parts of the cable from load and therefore for increasing the stressability in such a manner that the power line included in said cable is held at least virtually without loading, whereas the holding cable at least substantially absorbs all of the mechanical forces occurring for holding the wind power plant at the single positionally fixed anchoring point thereof. By means of this strain relief, the power line is additionally protected against damage.

The invention provides ballast units, preferably ballast tanks, the filling of which can be adapted to the weight, the weight distribution and the operating conditions of the wind power plant, and buoyancy units, in particular configured as cavities, which are included by the supporting unit, in particular a float structure, or form said supporting unit. Said float structure particularly preferably forms a semi-submersible. The latter is lowered during operation under the water surface to an extent such that as stable a position of the wind power plant in water as possible arises, i.e. that in particular listing, pitching and rolling of the wind power plant are kept to a minimum. For this purpose, the supporting unit can advantageously be designed with a double bottom in which the ballast tanks are arranged in a large volume. In particular, the ballast tanks are arranged in as deep a position as possible in the supporting unit and when filled form as high a weight portion as possible of the entire weight of the wind power plant. A weight portion of approx. 70% of the entire weight of the wind power plant is preferred. At the same time, the buoyancy units are arranged in as high a position as possible in the supporting unit. Overall, the effect thereby achieved is to keep the mass center of gravity of the structure of the wind power plant with the high supporting mast as low as possible. This together with a sufficiently large horizontal dimension of the supporting unit produces a large restoring moment counter to a listing moment acting on the wind power plant due to wind pressure and swell, even if said moment is produced by wind or swell possibly not coming from the front, i.e. occurring at least virtually in the direction of the axis of rotation of the rotor. As a result, even in the event of unfavorable weather conditions, for example in the event of sudden wind shifts or storm, a stable and secure position of the wind power plant in the water arises.

The electric generator is arranged together with the machine nacelle, which forms the housing of said generator, on the supporting mast in a fixed manner. Therefore, a large, sensitive and very expensive rotary bearing, also referred to as a yaw bearing, is not required since the entire floating wind power plant is oriented with respect to the wind. This makes the wind power plant lighter and mechanically very much more stable and helps in keeping the mass center of gravity of the entire wind power plant low and avoids wear at a location subjected to a high loading, such as the connection between machine nacelle and supporting mast. Since, in addition, the supporting mast is fixedly connected to the supporting unit, overall a highly stable, rigid constructional unit consisting of supporting unit, supporting mast and machine nacelle arises.

Of particular advantage is the articulated coupling of the wind power plant to the cable in respect of the fact that, furthermore, the wind power plant according to the invention is designed to automatically orient itself according to the wind direction during operation prior to or with the wind, with the force effect of the wind, i.e. to automatically pivot leeward about the anchoring point. By this means, the rotor is always optimally in the wind and therefore as high a power yield as possible is obtained. This self orientation takes place here without additional devices being required; in particular, drive or control units which are focused thereon and which necessitate an additional structure outlay and energy consumption are not required. This is a great advantage in comparison to, for example, a wind power plant which always has to be oriented during operation toward the wind, i.e. windward, always via complicated mechanical and control devices.

Preferably, the described self orientation of the wind power plant is furthermore promoted by the fact that as high as possible a horizontal distance is formed between the connecting point and a substantially vertical plane of rotation of the rotor. The fastening of the cable to the wind power plant is therefore undertaken as far away as possible from a lateral pressure point, i.e. a center of gravity of the wind forces acting on the surfaces around which the wind flows. The lateral pressure point of the entire wind power plant is determined, for example, by the supporting mast or the machine nacelle, but especially by the rotor and in particular the rotor blades thereof. The rotor has an at least substantially horizontal axis of rotation, and therefore, during rotation of the rotor, the rotor blades move substantially in an at least substantially vertical plane, which is referred to as the vertical plane of rotation of the rotor. The lateral pressure point of wind forces which act on the rotor and substantially contribute to forces which carry out the self orientation is also located in said plane.

By means of the furthest possible distance between the connecting point and the lateral pressure point of the wind forces acting on the rotor, i.e. the substantially vertical plane of rotation of the rotor, as high as possible a horizontal distance is formed which results in a greatest possible lever arm for the forces carrying out the self orientation, and therefore said forces can better counteract even possibly laterally occurring water currents, i.e. in particular oceanic currents. However, the distance is limited in particular by keeping to a stable position of the wind power plant in the water and therefore in particular by the dimensions of the supporting unit.

Furthermore, for this purpose, the rotor is preferably arranged on the machine nacelle in particular on the leeside of the machine nacelle in the operating position. This configuration increases the distance between the fastening of the cable to the wind power plant at the connecting point and a lateral pressure point of the rotor surfaces around which the wind flows, i.e. the rotor blades, and therefore assists an effective orientation of the wind power plant according to the wind direction.

Furthermore, the supporting mast is advantageously set upright with a sweep, i.e. is inclined at a predetermined angle in relation to the perpendicular to the wind direction acting during operation and therefore in the direction of the axis of rotation of the rotor. Said sweep of the supporting mast promotes the distance between the lateral pressure point of the wind pressure on the rotor and therefore on the wind power plant, on the one hand, and the connecting point of the cable, on the other hand. The distance between the supporting mast and the rotor also becomes larger as a result, and therefore a better incident flow on the rotor is achieved during operation.

The above-described features of the wind power plant according to the invention ensure in the combination thereof that the wind power plant is always automatically oriented during operation, even under extremely adverse weather conditions or water currents and swell, and is set upright again even from a severe listing.

Advantageous refinements of the invention are characterized in the dependent claims.

According to an advantageous development of the invention, the coupling with the slip coupling and/or the swivel coupling is suspended cardanically on the wind power plant. The individual parts of the coupling, namely the slip coupling and the swivel coupling, can have separate or else a common cardanic suspension here. By means of this configuration, particularly good movability in all degrees of freedom is achieved.

According to a preferred development of the wind power plant according to the invention, the supporting unit in each case has three ballast units and buoyancy units, wherein the buoyancy units are arranged in at least virtually the corners of a triangular plan view which is at least substantially symmetrical to an axis of rotation of the at least one rotor, and one of the ballast units extends between each two of the buoyancy units. The position of the axis of rotation of the rotor with respect to the plan view of the supporting unit is seen here in a top view of the wind power plant, i.e. vertically from above in the operating position. The at least substantially triangular configuration of the supporting unit is constructed in a simple manner and provides high mechanical strength, i.e. dimensional stability, as is required for use in particular at sea. In addition, the described substantially triangular configuration of the supporting unit provides high positional stability in water. Overall, this configuration is therefore preferred over other possible designs.

Water, as being available cost-effectively and universally, is preferably used as ballast in the ballast units. Other liquid ballast materials having preferably a higher specific weight are likewise possible. A liquid ballast material is also advantageous because of the simple handleability thereof. However, use may also be made of solid ballast materials, or the ballast units may contain a combination of solid ballast elements, in particular as the main weight, and a liquid ballast material for filling and trimming at the use location. This permits, for example, a shifting of the wind power plant or else only of parts thereof connected to the supporting unit, even in shallow water. The wind power plant according to the invention is shifted without ballast water, and therefore with only a low draft, into a harbor or a dockyard. At the use location, the wind power plant according to the invention has a high draft with ballast water under use conditions.

The buoyancy units are preferably formed with sealed air volumes; other substances, preferably gases or gaseous substances, may optionally also be used. An at least partial filling of the buoyancy units with porous substances, preferably plastic foams, is also possible. The latter permit a higher degree of security against leakages in the buoyancy units. It is also optionally possible here for a single solid filling or a filling remaining variable for subsequent trimming operations to be provided.

In the special arrangement described, the ballast units and buoyancy units thereby form the supporting unit, in particular a float structure, in such a manner that self orientation of the wind power plant takes place even in the event of listing because of swell and particular wind conditions.

According to a further advantageous refinement of the wind power plant according to the invention, the buoyancy units have double bottoms with additional ballast units. Said additional ballast units are preferably designed as ballast water tanks. An even more flexible configuration of the wind power plant and an even better adaptation to the use conditions, in particular even better trimming at the use location, are therefore possible.

In a further preferred embodiment of the wind power plant according to the invention, the supporting mast is arranged on the buoyancy unit which is centric with respect to the triangular plan view, which is at least substantially symmetrical to the axis of rotation of the at least one rotor. The centric arrangement benefits a simple, light, stable structure of the wind power plant. The supporting mast can then be realized to be particularly short and rectilinear despite a great mast height. Furthermore, a favorable center of gravity position which is centric with respect to the axis of rotation of the rotor in the top view of the wind power plant is produced in a simple manner.

According to another embodiment of the wind power plant according to the invention, the latter is characterized by in each case at least one, in particular one, strut for forming a connection between the supporting mast and the buoyancy units which are arranged laterally to the axis of rotation in the triangular plan view, which is at least substantially symmetrical to the axis of rotation of the at least one rotor. The supporting mast and the struts therefore form an in particular three-legged arrangement, each leg of which is supported on one of the buoyancy units in each case. In a modification with a larger number of struts and/or buoyancy units, a multi-legged arrangement is provided with one or more supports on each buoyancy unit or else only a selected number of all of the buoyancy units. This construction increases the mechanical strength of the entire wind power plant and at the same time makes it possible to keep the weight of the supporting mast and therefore the mass center of gravity of the entire wind power plant low and also centric. Furthermore, the structure of the supporting unit can thereby also be realized in a light and stable manner.

In an advantageous development of the wind power plant according to the invention, the ballast units are designed as construction elements which, in the operating state of the wind power plant, are arranged below a water line, in each case connect at least two of the buoyancy units and have at least virtually horizontal upper and lower sides. This configuration contributes to a stable and steady position of the wind power plant according to the invention even in the case of a relatively high swell. The swell exerts an oscillating exciting force on the floating structure of the wind power plant, wherein the frequency of this oscillation, the exciting frequency, is determined by the size and shape of the waves. The high weight portion of the ballast, for example the ballast water, and the at least virtually horizontal underwater surfaces of the ballast units provide the floating structure of the wind power plant with a low natural frequency of the oscillating position thereof in the water, which natural frequency is much lower than the exciting frequency of the swell. As a result, only a small effect of the oscillating exciting force impinges on the wind power plant, and therefore the latter executes at most small movements during a swell.

In yet another embodiment of the wind power plant according to the invention, the buoyancy units have a low water line cross section. A horizontal cross-sectional area through the buoyancy units at the level of the water line in the operating state is referred to here as such a water line cross section. Said water line cross section together with the specific weight of the buoyancy units at the level of the water line determines a change in buoyancy forces brought about by the buoyancy units when the immersion depth of the buoyancy units changes. In other words, the buoyancy force is produced by the displaced volume and the density thereof, here the density of water, according to Archimedes' principle. Therefore, the lower the water line cross section, also referred to as water line surface, the smaller are the changes in the buoyancy forces when the immersion depth of the buoyancy units changes. Conversely, the immersion depth changes during a swell. However, with a low water line cross section, this results only in small changes to the buoyancy forces exciting the wind power plant into oscillations and therefore only in small movements of the wind power plant in the event of or because of a swell.

On the other hand, too low a water line cross section in turn means that the changes in the buoyancy forces will be too low when the immersion depth of the buoyancy units changes. A change of the immersion depth, for example by the wind power plant listing during a storm, then only brings about too small a change of the buoyancy forces and therefore too low a force on the wind power plant for the self orientation thereof.

The term of the low water line cross section is therefore understood within the scope of the present invention as meaning a water line cross section which is dimensioned to be as low as possible without a noticeably disadvantageous reduction in the forces on the wind power plant for the self orientation thereof occurring, wherein the disadvantageous effect of said reduction in the forces on the wind power plant can also be countered by the geometrical shape and position of the buoyancy elements by the buoyancy elements being arranged, for example, as far as possible on the outside in the supporting unit.

Since the transmission of the exciting force to the floating structure of the wind power plant depends on the size of the water line cross section and on the emergence or immersion depth due to the swell and since said transmission is not desirable, the water line cross sections have been selected to be as low as possible. As a result, the transmission of the exciting force is kept low. Also as a result, the natural frequency of the wind power plant is kept low and occurrence of a resonance is avoided. The wind power plant thus does not carry out any vigorous movements, but rather lies steadily in the water. In a simulation calculation for a dimensional example, an acceleration in the machine nacelle of below 0.4 g in the event of a wave height of 5.0 m, which is significant for the conditions, for example in the north sea, has been determined.

Yet another advantageous embodiment of the wind power plant according to the invention is characterized in that the buoyancy units and/or the ballast units are of streamlined design, in particular are streamlined in a direction at least virtually parallel to the axis of rotation of the at least one rotor.

Since wind direction and wave direction generally do not differ greatly from each other, elongate water line cross sections have been selected for the streamlined design in the direction of the axis of rotation of the at least one rotor, and the end surfaces of the buoyancy units or of the ballast units point forward, i.e. counter to the wind direction and wave direction, in order to divide a steep swell with as low a force as possible. As a result, forces applied to the cable or holding cable, to the coupling to the wind power plant and to the anchoring point by the swell and/or water current are reduced and therefore so too are the loading and risk of breaking of said structure elements.

Yet another preferred embodiment of the wind power plant according to the invention is characterized by a mass and a buoyancy center of gravity position at least approximately in the geometrical center point of a plan view of the supporting unit, i.e. as viewed from the top view of the wind power plant. In particular in the case of a configuration with three buoyancy units arranged in a triangular plan view, the mass and buoyancy center of gravity is advantageously arranged at least approximately centrically, i.e. in the geometrical center of the triangular plan view. Furthermore, in the arrangement of the mass and buoyancy center of gravity, it is advantageously also possible to take into consideration the wind pressure in the direction of the axis of rotation of the at least one rotor, i.e. in the wind direction in the operating position of the wind power plant, and therefore the latter does not undesirably list sharply leeward even in the event of a relatively great wind strength, in particular in the event of a storm.

For a stable position of the wind power plant in water, the mass center of gravity is preferably arranged below the buoyancy center point of gravity. However, in the case of the wind power plant according to the invention, a stable position can still be kept in the water even if the mass center of gravity is located above the buoyancy center of gravity, and, in the event of the wind power plant listing, the buoyancy center of gravity is shifted leeward by the supporting unit being immersed to a greater extent on the lee side, and said shifting takes place by means of the configuration of the supporting unit, in particular the buoyancy units, until a lever arm is produced in relation to the mass center of gravity. A moment is therefore caused which brings about a setting upright of the wind power plant from the listing. The starting point here is the fact that only the displacement center of gravity is shifted. The mass center of gravity remains in its position. A distance is therefore produced between a vector of the buoyancy force and a vector of the weight and therefore so too is a setting-upright moment.

In yet another preferred embodiment of the wind power plant according to the invention, the cable which is designed as a combination of a power line and a holding cable is connectable at the anchoring point to an anchoring device. As a result, mechanical anchoring to the bottom of the body of water on which the wind power plant according to the invention is operated, for example on the ocean bed, and at the same time an electrical connection to consumers of the electrical energy obtained take place simply and effectively via the anchor device.

In a further preferred embodiment of the wind power plant according to the invention, the supporting mast has a cross section formed in a profile shape, in particular a cross section formed in a wing-like and/or droplet-shaped profile shape. The purpose of this configuration consists in avoiding vertices in the air flow behind the supporting mast, by means of which the rotor blades would otherwise have to be moved. In particular, a wing-like or droplet-shaped profile is intended to be used. A configuration with one of the "NACA profiles", i.e. one of the two-dimensional standardized cross sections of wing profiles, as has been developed by the former "National Advisory Committee for Aeronautics" for the design of aircraft wings, is particularly preferred. Therefore, in comparison to a design of the supporting mast, for example with a circular profile, particularly favorable, at least virtually vortex-free air flows can be achieved in a simple manner.

In addition, the configuration of the supporting mast of the wind power plant in a profile shape promotes the self orientation of the wind power plant into the respective wind direction, i.e. leeward, since the profile is arranged in the longitudinal extent thereof at least virtually in the direction of the axis of rotation of the rotor. Therefore, substantially higher forces are produced on the profile and therefore on the supporting mast when the flow is incident on the profile at a right angle to the longitudinal direction and therefore to the axis of rotation than when the flow is incident in the direction of the axis of rotation. This increases the restoring forces for the self orientation and at the same time reduces the wind pressure on the supporting mast in the optimal operating orientation with respect to the wind, which also reduces the stress on the anchoring, i.e. the cable and the coupling.

In addition, the configuration of the supporting mast of the wind power plant in a profile shape affords the advantage that the profile mast offers the highest moment of resistance in the main loading direction, when optimally oriented with respect to the wind, and therefore can be dimensioned with substantially smaller wall thicknesses than, for example, a supporting mast with a round profile which has the same moment of resistance in each direction and therefore also has to be configured for a high moment of resistance in a loading direction in which a correspondingly high loading does not occur during operation, and which profile would therefore be overdimensioned and therefore unnecessarily expensive and heavy.

According to a further preferred embodiment of the wind power plant according to the invention, a non-positive, energy-transmitting connection is formed gearlessly between the at least one rotor and the at least one electric generator. This connection therefore does not have any gearing between rotor and generator, but rather merely an at least substantially rigid transmission of torque, which likewise reduces the outlay on maintenance, promotes stability during permanent operation and reduces energy losses.

BRIEF DESCRIPTION OF THE DRAWINGS

Exemplary embodiments of the invention are illustrated in the drawing and are described in more detail below, wherein corresponding elements are provided with the same reference signs in all of the figures and a repeated description of said elements is omitted. In the drawing.

PREFERRED EMBODIMENTS OF THE INVENTION

Figure 1:
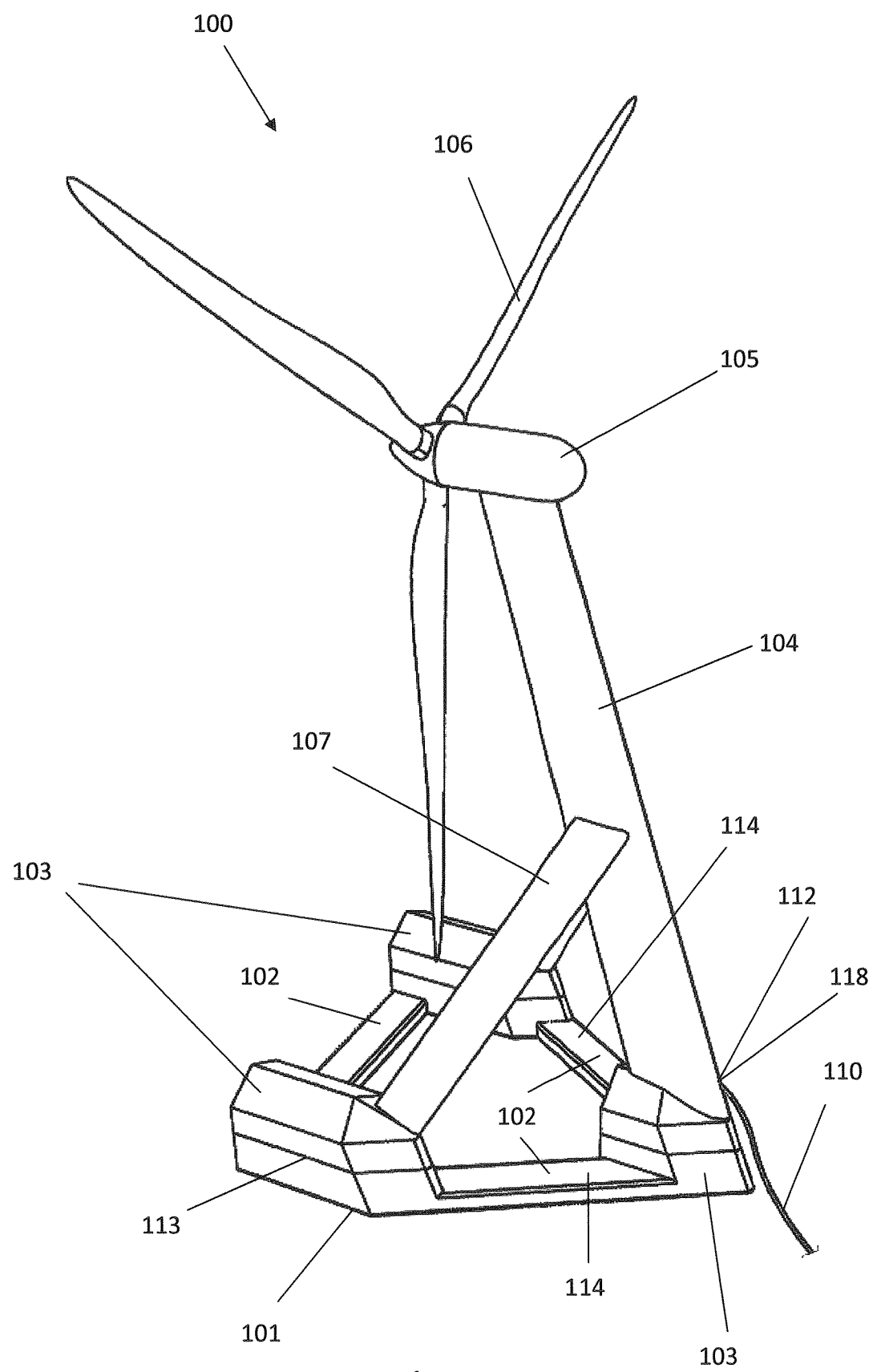
FIG. 1 shows an example of a wind power plant according to the invention in a schematic perspective illustration.

In the two figures, an exemplary embodiment of a floatable offshore wind power plant according to the invention is denoted by the reference sign 100. Said offshore wind power plant comprises a supporting unit 101 which is configured in particular as a float unit and is formed with in each case three ballast units 102 and buoyancy units 103. The buoyancy units 103 are preferably also equipped with ballast tanks in a double bottom. The buoyancy units 103 are arranged at corners of a substantially triangular plan view and are connected to one another by one of the ballast units 102 in each case. A supporting mast 104 is arranged on a first of the buoyancy units 103 in a slight sweep, i.e. inclination toward the center of the substantially triangular plan view of the supporting unit 101. A machine nacelle 105 is arranged fixedly, i.e. in particular non-rotatably, to the upper end of the supporting mast 104. The machine nacelle 105 contains an electric generator (not illustrated), for the drive of which by wind power a rotor 106 which is rotatable about an axis of rotation 117, which is at least substantially horizontally oriented in the operating position, is arranged on the lee side of the supporting mast 104 and therefore the machine nacelle 105. A non-positive, energy-transmitting connection (likewise not illustrated) between the rotor 106 and the electric generator is preferably of gearless design. Approximately half way up the supporting mast 104, struts 107 are connected on both sides, one on each side, on the end sides to the supporting mast 104. The struts 107 are supported by the respectively other ends thereof on one of the buoyancy units 103 in each case. In this manner, a structure in the form of a tetrahedron is formed by the supporting unit 101, the supporting mast 104 and the struts 107, said structure providing high mechanical strength and a stable position when floating in the water. The stable position when floating in the water is also produced by the arrangement of the ballast units 102 and buoyancy units 103 with respect to each other. The lee side of the illustrated wind power plant 100 during operation is additionally indicated by arrows 108 which symbolize the wind direction during the operation of the wind power plant 100.

Figure 2:
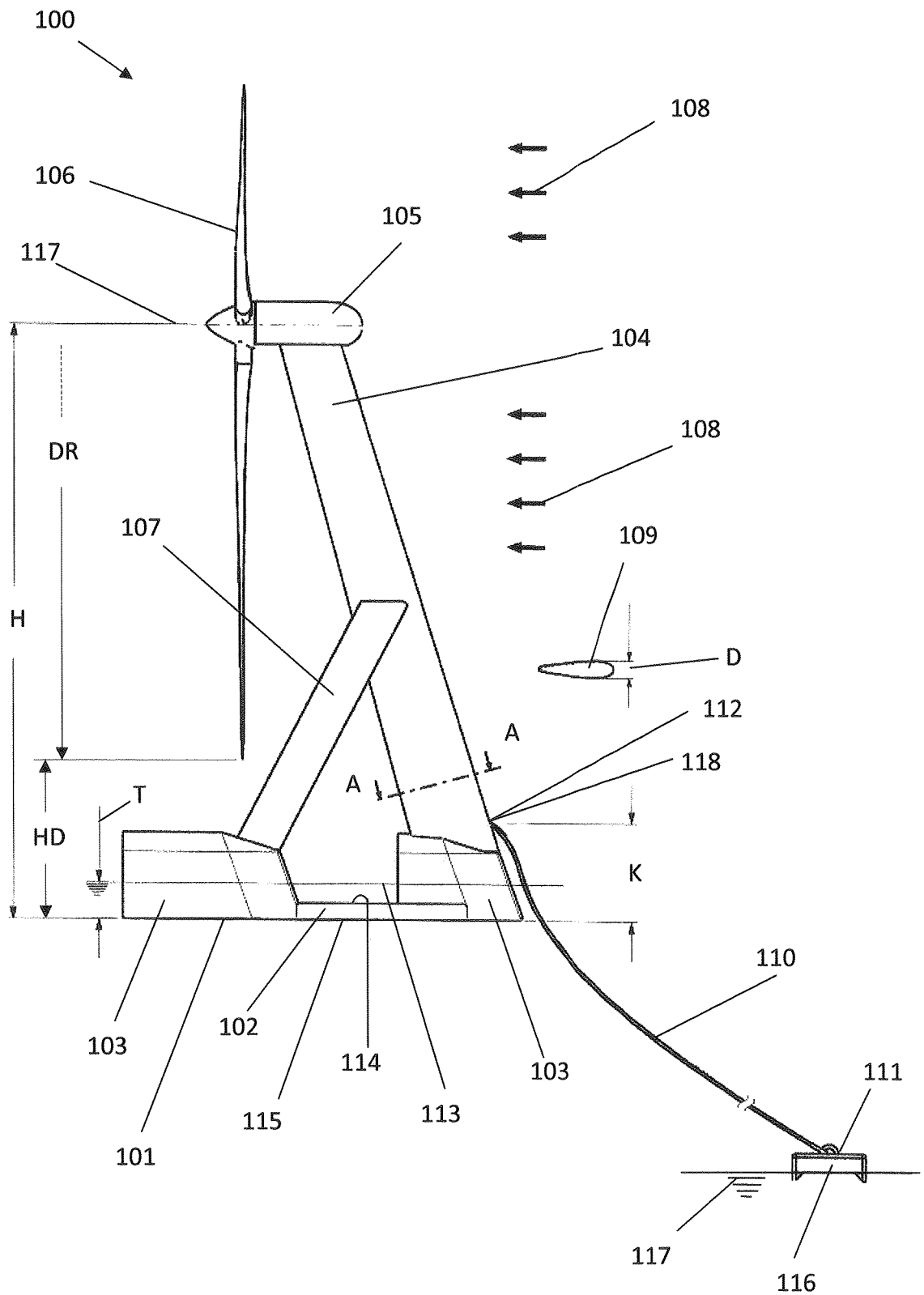
FIG. 2 shows a schematic side view of the example of the wind power plant according to FIG. 1.

Along a sectional plane A-A, the supporting mast 104 has a cross section formed in a profile shape, in particular a cross section formed in a wing-like and/or droplet-shaped profile shape, which is reproduced in a detailed sketch in FIG. 2 at the reference sign 109. Said profile shape, which is preferably symmetrical here with respect to a longitudinal axis, provides a streamlined design, around which the air flows without vortices, with a low wind resistance and greatest moment of resistance in the main loading direction when optimally oriented with respect to the wind. As a result, the supporting mast 104 is light and nevertheless is designed to be able to bear extreme loads. The struts 107 are preferably configured with the same or a substantially similar or corresponding profile shape in order also here to achieve an optimum flow there around with little wind resistance and with a high strength and low weight. As a result, not only is the mechanical stability of the entire wind power plant increased, but the keeping to a low mass center of gravity point and a low wind resistance of the entire wind power plant is also ensured.

During operation, the wind power plant 100 is automatically oriented according to the wind direction in such a manner that the supporting mast 104 is on the windward side and the rotor 106 on the leeward side. Since, during operation, the wind power plant 100 floats on the body of water on which the latter is used, this orientation takes place by corresponding rotation of the entire wind power plant 100 on the water. For this purpose, the wind power plant, in order to keep to an operating position, i.e. the position on the body of water on which it is operated, is connectable to a single anchoring point 111 by a single cable 110, which is designed as a combination of a power line and a holding cable, wherein a coupling 112 is arranged at a single connecting point 118 between the cable 110 and the wind power plant 100 and, for an electrical connection, is formed with a slip coupling and, for a mechanical transmission of force, is formed with a swivel coupling. Designs which are known per se are used for said structural elements of the coupling 112, and therefore a simple and reliable design is formed overall for coupling 112 and cable 110. As a result, the mechanical forces which occur are at least virtually completely absorbed by the swivel coupling, and therefore the slip coupling is kept free from mechanical loadings by forces which occur from keeping the wind power plant at the operating position.

The ballast accommodated in the ballast units 102 is formed, for example, by water, but other liquid substances or else at least partially solid ballast may also be used. In at least some of the ballast units 102, a division into, for example, a plurality of ballast tanks or a combination of solid ballast elements and ballast tanks or the like is advantageously undertaken in order to obtain better trimming capability of the wind power plant 100. Devices can also be provided with which trimming of the ballast is also possible during operation, for example for adaptation to changing weather conditions, such as swell, wind strength and the like.

In order to produce the required buoyancy, in particular air or another gas, optionally an inert gas in order to reduce corrosion, is arranged in the buoyancy units 103. The buoyancy units 103 can optionally also be at least partially filled with gaseous foams, for example plastic foams, as a result of which a relatively great resistance capability in relation to damage or other leakages and therefore greater security against sinking are provided. The ballast units 102 and buoyancy units 103, in the specific arrangement thereof, form a configuration of the supporting unit 101 in such a manner that self orientation of the wind power plant takes place even in the event of severe listing because of the swell and particular wind conditions. A high degree of security against operational impairments, damage or even loss of the wind power plant 100 is therefore likewise obtained.

In the wind power plant 100 illustrated, the ballast units 102 are designed as structural elements which, in the operating state of the wind power plant 100, are arranged below a water line 113, up to which the wind power plant is immersed in the operating state, and have at least approximately horizontal upper and lower sides 114 and 115 and, as already described, in each case connect at least two of the buoyancy units 103. The at least approximately horizontal upper and lower sides 114 and 115 supply the wind power plant 100 with a low natural frequency of the oscillations thereof in water, i.e. in particular of the rolling and pitching movements thereof during a swell, and therefore reduce said movements.

The buoyancy units 103 have a low water line cross section, i.e. a low horizontal cross-sectional area at the level of the water line 113. This reduces the buoyancy forces of the swell, which excite oscillations of the wind power plant 100, on the supporting unit 101 and therefore the movements caused by said buoyancy forces in a swell. Furthermore, in particular the buoyancy units 103 and advantageously also the ballast units 102 are of streamlined design, in particular streamlined in the direction at least approximately parallel to the axis of rotation 117 of the rotor 106. For this purpose, in particular the buoyancy units 103 are configured to converge to a point at the end regions thereof which are directed counter to the water current and air flow essentially occurring in the operating position.

Overall, the previously described supporting unit 101 with the ballast units 102 and the buoyancy units 103 is designed as a semi-submersible.

The streamlined design of the supporting unit 101, of the supporting mast 104, of the struts 107 and furthermore also of the machine nacelle 105 brings about a reduction in the forces applied to the cable 110, to the coupling 112 and to the anchoring point 111 by the swell or a water current and wind forces, as a result of which the last-mentioned structural elements, firstly, can be subjected to less stress, and are therefore better protected against failure, and, secondly, can be of correspondingly lighter and material-saving design.

In the case of the wind power plant 100 illustrated, the position both of the mass center of gravity and of the buoyancy center of gravity is advantageously located at least approximately in the geometrical center point of the top view of the supporting unit 101. This provides security, which is as directionally independent as possible, against overturning of the wind power plant 100 when listing in a storm or heavy sea. The wind pressure may additionally be taken into consideration in the establishing of the centers of gravity; for example, shifting of the ballast can be undertaken by recirculating ballast water depending on the wind pressure and therefore listing of the wind power plant 100 in order always to maintain a rectilinear position in the water, i.e. a position without listing.

The wind power plant 100 is connected via the cable 110, which is designed as a combination of a power line and a holding cable, at the anchoring point 111 to an anchor device 116 via which both a mechanical anchoring of the wind power plant 100 at the bottom of the body of water, in particular on the ocean floor 117, and also an electrical connection to an electrical energy transport and distribution network is produced. An anchor device 116 of this type is formed, for example, by a concrete element, preferably by a concrete element which is fillable with additional ballast, such as water or in particular sand, at the operating and anchoring location. Instead of the concrete element, the anchor device 116 may also have a steel element.

In a dimensional example, the wind power plant 100 has the following dimensions:

height from the lower side of the supporting unit 101, i.e. from the lower side 115 of the ballast elements 102 as far as the axis of rotation 117 of the rotor 106: H=105 m;

immersion depth between the water line 113 and the lower side of the supporting unit 101, i.e. the lower side 115 of the ballast elements 102: T=6.50 m;

distance between the connecting point 118, i.e. the coupling 112, and the lower side of the supporting unit 101, i.e. the lower side 115 of the ballast elements 102: K=17.50 m;

profile thickness of the cross section 109 of the support mast 104: D=3.00 m;

turning circle diameter of the rotor 106: DR=154.00 m;

distance of the turning circle from the lower side of the supporting unit 101, i.e. from the lower side 115 of the ballast elements 102: HD=28.00 m;

this corresponds during operation to a distance of the turning circle from the water line 113 of 21.50 meters.

In a further dimensional example, the wind power plant 100 has the following dimensions differing from the above, wherein the remaining sizes are identical:

height from the lower side 115 of the ballast elements 102 as far as the axis of rotation 117 of the rotor 106: H=111.50 m;

immersion depth between the water line 113 and the lower side 115 of the ballast elements 102: T=13.00 m;

distance between the connecting point 118, i.e. the coupling 112, and the lower side of the supporting unit 101, i.e. the lower side 115 of the ballast elements 102: K=24.00 m;

distance of the turning circle from the lower side of the supporting unit 101, i.e. the lower side 115 of the ballast elements 102: HD=34.50 m.

This latter dimensional example is denoted as being particularly favorable with respect to the stability thereof against wind and swell.

It should be noted for the sake of completeness that the illustration in FIGS. 1 and 2 has not been undertaken exactly to scale for all of the exemplary embodiments or dimensional examples of the wind power plant 100 according to the invention.

LIST OF REFERENCE SIGNS

100 Floatable offshore wind power plant
101 Supporting unit
102 Ballast unit of 101
103 Buoyancy unit of 101
104 Supporting mast
105 Machine nacelle
106 Rotor
107 Strut
108 Arrow: wind direction
109 Cross section (profile) of 104
110 Cable
111 Anchoring point between 110 and 116
112 Coupling: slip coupling (electrical) and swivel coupling (mechanical)
113 Water line
114 Upper side of 102
115 Lower side of 102
116 Anchor device
117 Axis of rotation of 106
118 Connecting point between 100 and 110
A-A Sectional plane of the cross section 109 through 104
D Profile thickness of 109
DR Turning circle diameter of the rotor 106
H Height between 117 and 115
HD Distance of the turning circle DR from the lower side of the supporting unit 101
K Distance between 112 and 115
T Immersion depth between 113 and 115

The invention claimed is:

1. A floatable offshore wind power plant assembly, comprising a cable and a wind power plant:

the cable comprising a combination of a power line which is held at least virtually without loading, and a holding cable which at least substantially absorbs mechanical forces occurring for holding the wind power plant at a single positionally-fixed anchoring point, wherein the wind power plant assembly is connectable to the anchoring point so as to be movable in six degrees of freedom, and wherein a coupling is arranged in a single connecting point between the cable and the wind power plant and is formed with a slip coupling to provide an electrical connection and with a swivel coupling to provide a mechanical transmission of force;

and further wherein the wind power plant includes a float unit, which is a semi-submersible and comprises ballast units and buoyancy units, wherein the buoyancy units have a sufficiently low water line cross section to minimize a change to buoyancy forces from a change of an immersion depth of the buoyancy units during a swell, wherein the ballast units are designed as construction elements which, in the operating state of the wind power plant, are arranged below a water line, and wherein each ballast unit connects at least two of the buoyancy units and has at least approximately horizontal upper and lower sides;

the wind power plant includes a supporting mast which is fixedly connected to the float unit, a machine nacelle which is fixedly arranged on said supporting mast without a yaw bearing, and at least one rotor and at least one electric generator;

the rotor is arranged on a leeside of the machine nacelle in an operating position so that a highest possible horizontal distance on the wind power plant is formed between the connecting point and a lateral pressure point of wind forces in a substantially vertical plane of rotation of the rotor; and the supporting mast has a cross section formed in a wing-like and/or droplet-shaped profile shape, wherein the profile shape is arranged in the direction of an axis of rotation of the rotor to promote a self-orientation of the wind power plant into the leeward wind direction wherein the self-orientation takes place passively without drive units or control units for orientation of the wind power plant.

2. The wind power plant assembly of claim 1, wherein the coupling with the slip coupling and the swivel coupling is suspended cardanically on the wind power plant.

3. The wind power plant assembly of claim 1, wherein the buoyancy units have double bottoms with additional ballast units.

4. The wind power plant assembly of claim 1, wherein the buoyancy units and/or the ballast units are of streamlined design.

5. The wind power plant assembly of claim 1, wherein a mass and buoyancy center of gravity position is in the geometrical center point of a plan view of the float unit.

6. The wind power plant assembly of claim 1, wherein the cable is connectable at the anchoring point to an anchoring device.

7. The wind power plant assembly of claim 1, wherein a non-positive, energy-transmitting connection is formed gearlessly between the at least one rotor and the at least one electric generator.

8. The wind power plant assembly of claim 4, wherein the buoyancy units and/or the ballast units are streamlined in a direction at least virtually parallel to the axis of rotation of the at least one rotor.

9. The wind power plant assembly of claim 1, wherein three buoyancy units of the float unit are arranged at least virtually in corners of a triangular plan view which is at least substantially symmetrical to an axis of rotation of the at least one rotor, and wherein one ballast unit extends between each two laterally adjacent buoyancy units in the float unit.

10. The wind power plant assembly of claim 9, wherein the supporting mast is arranged on the buoyancy unit which is centric with respect to the triangular plan view which is at least substantially symmetrical to the axis of rotation of the at least one rotor.

11. The wind power plant assembly of claim 10, wherein for each buoyancy unit which is laterally adjacent to the buoyancy unit on which the mast is arranged, exactly one strut connects the supporting mast and the buoyancy unit which is laterally adjacent to the buoyancy unit on which the mast is arranged.

12. The wind power plant assembly of claim 10, wherein the connecting point is at an edge of the wind power plant.

13. The wind power plant assembly of claim 10, wherein the connecting point is above a lower side of the wind power plant.

* * * * *

UNITED STATES PATENT AND TRADEMARK OFFICE
CERTIFICATE OF CORRECTION

PATENT NO. : 10,677,224 B2  
APPLICATION NO. : 15/027859  
DATED : June 9, 2020  
INVENTOR(S) : Jens Cruse Page 1 of 1

It is certified that error appears in the above-identified patent and that said Letters Patent is hereby corrected as shown below:

On the Title Page

Item (30), change "10 2013 111 115" to --10 2013 111 115.7--.

Signed and Sealed this  
Eighth Day of September, 2020

Andrei Iancu  
*Director of the United States Patent and Trademark Office*